US006696954B2

United States Patent
Chung

(10) Patent No.: US 6,696,954 B2
(45) Date of Patent: Feb. 24, 2004

(54) ANTENNA ARRAY FOR SMART RFID TAGS

(75) Inventor: Kevin Kwong-Tai Chung, Princeton, NJ (US)

(73) Assignee: Amerasia International Technology, Inc., Princeton Junction, NJ (US)

(*) Notice: Subject to any disclaimer, the term of this patent is extended or adjusted under 35 U.S.C. 154(b) by 0 days.

(21) Appl. No.: 09/854,722

(22) Filed: May 14, 2001

(65) Prior Publication Data

US 2002/0044096 A1 Apr. 18, 2002

Related U.S. Application Data

(60) Provisional application No. 60/260,849, filed on Jan. 10, 2001, provisional application No. 60/255,162, filed on Dec. 13, 2000, provisional application No. 60/252,128, filed on Nov. 20, 2000, provisional application No. 60/248,454, filed on Nov. 14, 2000, provisional application No. 60/245,596, filed on Nov. 3, 2000, provisional application No. 60/243,640, filed on Oct. 26, 2000, and provisional application No. 60/240,748, filed on Oct. 16, 2000.

(51) Int. Cl.[7] .............................................. G08B 13/14
(52) U.S. Cl. ................................ 340/572.7; 340/572.1; 343/745; 343/748; 343/843; 343/844; 343/866; 343/867; 343/894
(58) Field of Search ............................. 340/572.7, 551, 340/572.1, 552, 745, 748, 893, 894, 866; 867; 343/894

(56) References Cited

U.S. PATENT DOCUMENTS

| | | | | |
|---|---|---|---|---|
| 3,832,530 A | * | 8/1974 | Reitboeck et al. | ..... 235/61.11 H |
| 4,135,184 A | * | 1/1979 | Pruzick | ...................... 340/572 |
| 4,663,625 A | * | 5/1987 | Yewen | .................. 340/825.54 |
| 5,221,831 A | * | 6/1993 | Geiszler | ...................... 235/440 |
| 5,258,766 A | | 11/1993 | Murdoch | |
| 5,327,118 A | * | 7/1994 | Drucker et al. | ............. 340/572 |
| 5,842,118 A | | 11/1998 | Wood | |
| 5,923,251 A | | 7/1999 | Raimbault et al. | |
| 5,929,760 A | * | 7/1999 | Monahan | .................. 340/572.7 |
| 5,963,134 A | | 10/1999 | Bowers | |
| 5,973,599 A | | 10/1999 | Nicholson | |
| 6,034,604 A | * | 3/2000 | Kaltner | ...................... 340/572.3 |
| 6,069,564 A | | 5/2000 | Hatano | |
| 6,094,173 A | * | 7/2000 | Nylander | ...................... 343/742 |
| 6,127,928 A | | 10/2000 | Issacman | |
| 6,351,215 B2 | * | 2/2002 | Rodgers et al. | .......... 340/572.1 |
| 6,517,000 B1 | * | 2/2003 | McAllister et al. | .... 235/462.01 |

FOREIGN PATENT DOCUMENTS

| | | |
|---|---|---|
| EP | 0 496 609 A1 | 7/1992 |
| EP | WO 01/65712 A1 | 9/2001 |
| GB | 2 077 555 A | 12/1981 |
| WO | WO 00/14694 | 3/2000 |

OTHER PUBLICATIONS

Datatronic 2000 "Radio Frequency Identification Equipment and Systems", Aug. 28, 1999, 8 sheets.
Avante International Technology, Inc., www. Smart–Trakker.Com, Printout 2001, 8 sheets.

* cited by examiner

*Primary Examiner*—Daniel J. Wu
*Assistant Examiner*—Tai T. Nguyen
(74) *Attorney, Agent, or Firm*—Dann, Dorfman, Herrell & Skillman, P.C.

(57) ABSTRACT

An antenna array comprises a plurality of antenna loops disposed to define a portal or passageway or other detection region in which the plural antenna loops transmit and/or receive electromagnetic signals. A processor coupled to the plural antenna loops processes at least the received signals and/or transmitted signals. The plural antennas may be arrayed in a rectangular array, on hanging flexible substrates or other suitable arrangement, and may be coupled to the processor by a filter or selective switch. The processor may be coupled to a utilization system for cooperating therewith for performing a desired function.

55 Claims, 5 Drawing Sheets

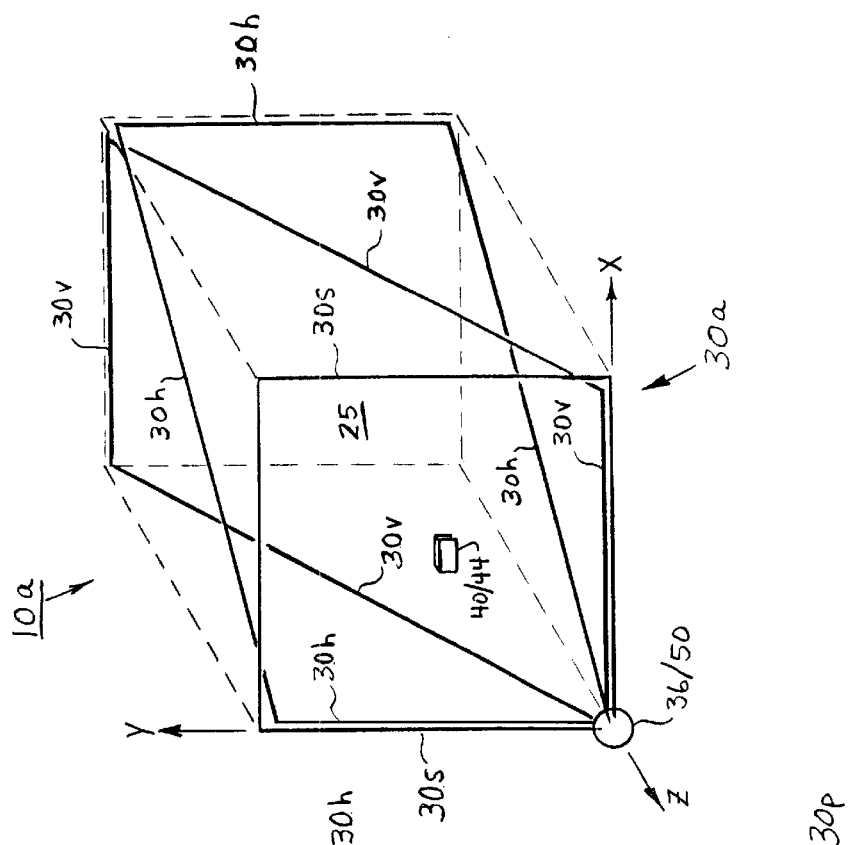
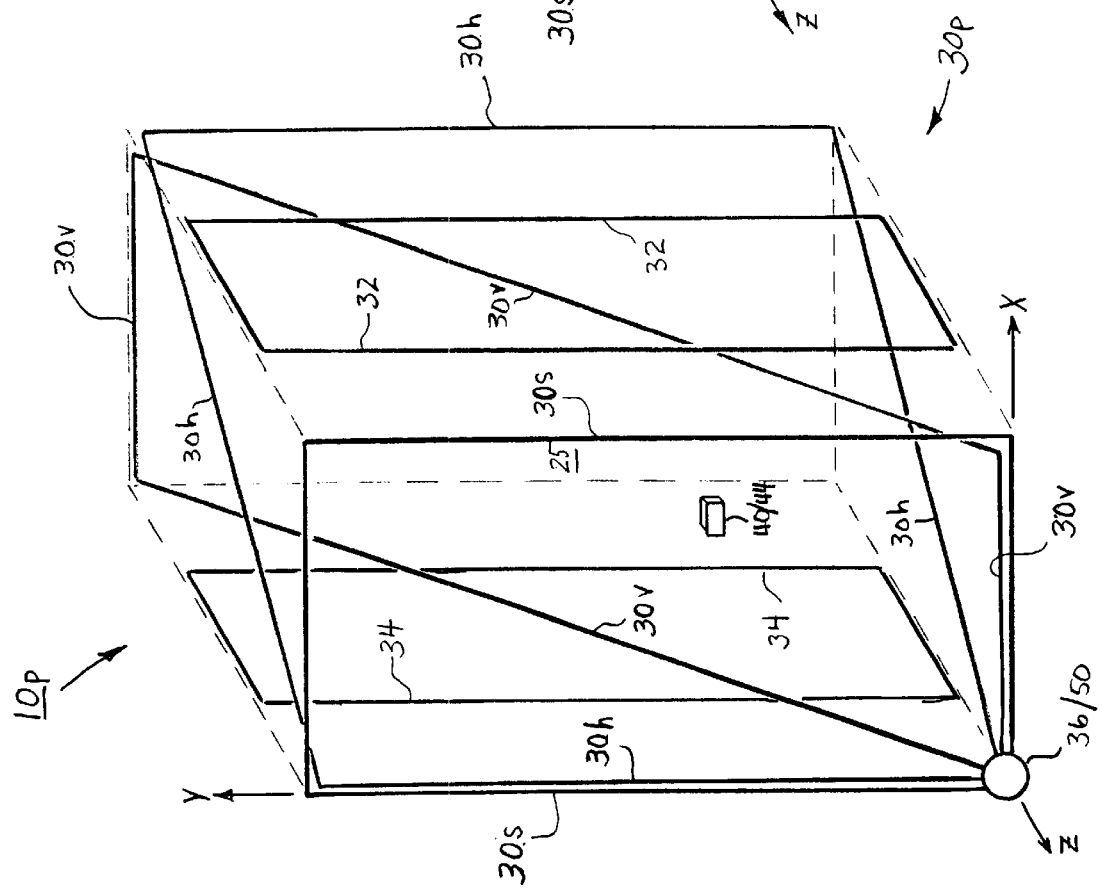

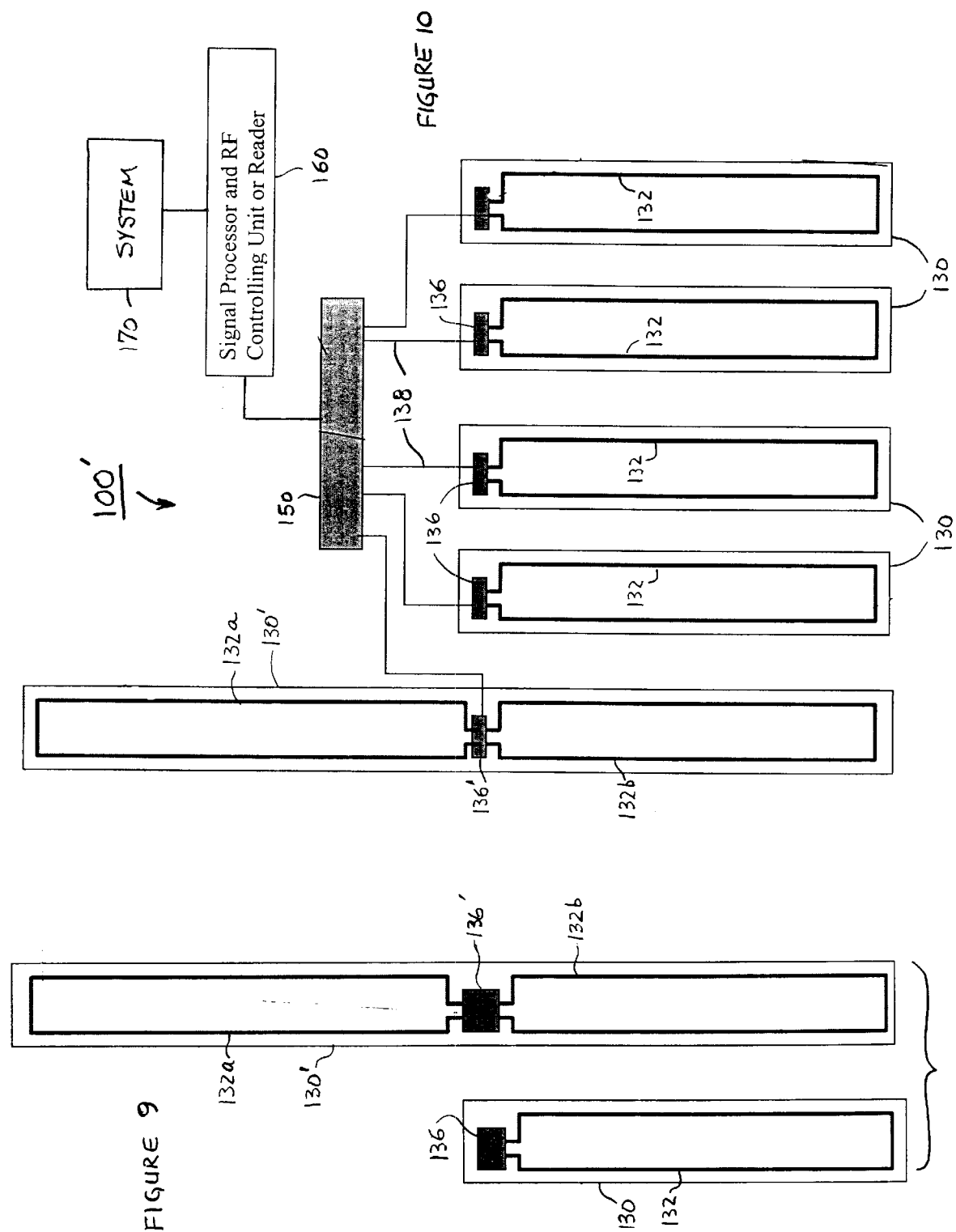

ANTENNA ARRAY FOR SMART RFID TAGS

This Application claims the benefit of U.S. Provisional Application Ser. No. 60/240,748 filed Oct. 16, 2000, of U.S. Provisional Application Ser. No. 60/243,640 filed Oct. 26, 2000, of U.S. Provisional Application Ser. No. 60/245,596 filed Nov. 3, 2000, of U.S. Provisional Application Ser. No. 60/248,454 filed Nov. 14, 2000, of U.S. Provisional Application Ser. No. 60/252,128 filed Nov. 20, 2000, of U.S. Provisional Application Ser. No. 60/255,162 filed Dec. 13, 2000, and of U.S. Provisional Application Ser. No. 60/260,849 filed Jan. 10, 2001.

The present invention relates to an antenna array and, in particular, to an antenna array for wireless articles.

Increasingly, technological means are desired for detecting the presence of people and articles, for identifying people and articles, and for tracking people and articles. Applications of such technology run the gamut, from theft detection devices used in food markets, department stores and other retail establishments, to inventory of products and warehouse stocks, to the control, routing and tracking of baggage at airports, train stations and other travel facilities, and for providing selective access and/or security for personnel and facilities such as hotels, schools, businesses, government facilities and the like, to name but a few.

Conventional prior art systems typically employ a detection portal such as that illustrated in FIG. 1. Portal 2 includes two parallel planar panels 4 each containing a loop antenna coupled to a detector. Panels 4 are supported by base 6. Prior art portal 2 typically is utilized with "tags" that may simply be a small sheet of a metal foil or a simple non-linear electronic device such as a diode coupled to a loop antenna. The presence of such tag in the region between the parallel panels 4 results in a distortion of the radio frequency (RF) signal transmitted by the antennas in panels 4 which is detected and utilized to set off an alarm, such as a buzzer, bell or other audible alarm and/or a light, flashing light or other visible alarm. Thus the system is simply a proximity detector for a tag in the proximity of panels 4.

More sophisticated detection systems might desire to not only detect the presence of a tagged article or person, but also to identify the article or person by identifying the tag. Such systems typically utilize a tag that includes an electronic device coupled to the loop antenna thereof, typically to respond to receipt of RF signals transmitted by the antenna of panels 4 by transmitting an identifying number or code, whereby apparatus to which panels 4 are connected identify the tag.

Conventional antenna arrays utilized in prior art portals typically are not capable of reading 100% of the tags passing in their proximity irrespective of the orientation of the RF tag, i.e. coupling to the antenna of the tag is inadequate at certain tag orientations. While 95% or 98% detection and accuracy may be satisfactory for many applications, it is not satisfactory for more demanding applications such as tracking passenger baggage for air travel, tracking factory and/or warehouse inventory, or identifying persons for security and/or access control.

Accordingly, it would be desirable to have an antenna array that is capable of detecting the presence of a wireless article such as an RF tag within its detection region with 100% accuracy or very close to 100% accuracy. It would also be advantageous if such antenna array was capable of operating with wireless articles that include an electronic device (also referred to as an integrated circuit or "IC" or as a chip) including a memory so that information could be written into the memory of the wireless article as well as read from the memory and transmitted by the wireless article.

To this end, the antenna array of the present invention comprises at least two antenna loops disposed at an angle with respect to each other to define a detection region in which the two antenna loops transmit and/or receive electromagnetic signals having electromagnetic components in each of three mutually orthogonal directions and through which an object may pass. A processor processes at least received signals, and means couples the at least two antenna loops and the processor for coupling at least the received signals therebetween.

BRIEF DESCRIPTION OF THE DRAWING

The detailed description of the preferred embodiments of the present invention will be more easily and better understood when read in conjunction with the FIGURES of the Drawing which include:

FIGS. 5A and 5B are isometric view schematic diagrams of exemplary antenna arrays having non-orthogonal antennas, in accordance with the invention;

FIG. 9 is a plan view schematic diagram illustrating an exemplary elongated aspect ratio antenna and an exemplary plural antenna suitable for use in accordance with the invention; and FIG. 10 is an elevation view schematic diagram of an exemplary detection system employing a detection portal including an exemplary partible curtain antenna array and an exemplary elongated plural antenna, in accordance with the invention.

Figure 1:
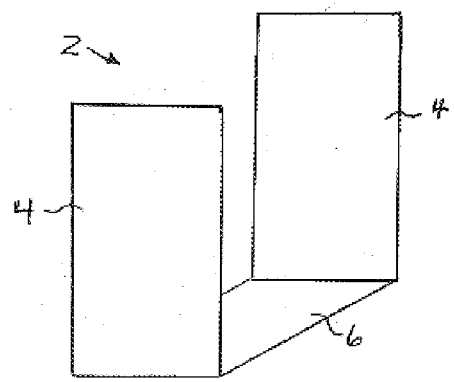
FIG. 1 is an isometric view schematic diagram of a prior art detection portal including an antenna array.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on. It is noted that, according to common practice, the various features of the drawing are not to scale, and the dimensions of the various features are arbitrarily expanded or reduced for clarity.

DESCRIPTION OF THE PREFERRED EMBODIMENTS

Figure 2:
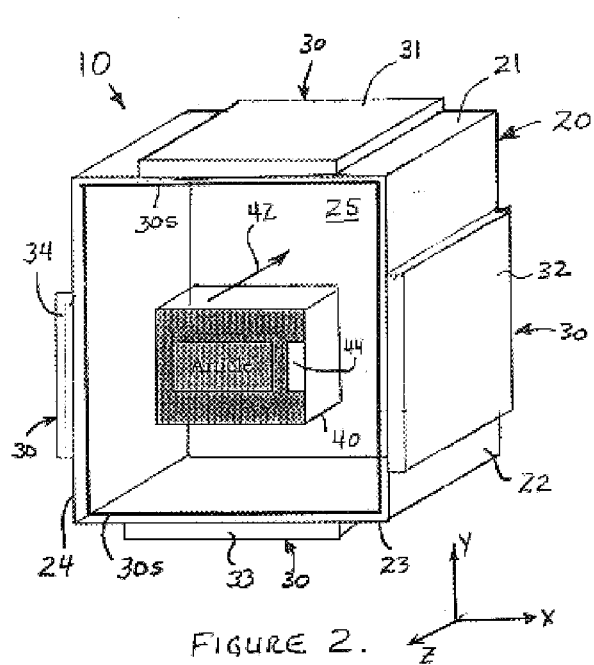
FIGS. 2 and 3 are isometric view schematic diagrams of exemplary detection portals including an antenna array, in accordance with the invention.

FIG. 2 is an isometric view schematic diagram of an exemplary detection portal 10 including an optional physical portal 20 and an antenna array 30, in accordance with the invention. Portal 20 is an exemplary rectangular portal 20 includes four sides, for example, top 21, bottom 23, and sides 22 and 24, defining a passage 25 therethrough. While portal 20 may be square for certain applications, for example, providing a typical about 3-foot by 3-foot (about 0.9 meter by 0.9-meter) square passage through which objects such as baggage is moved by conveyor at an airport, it is generally rectangular for most applications such as doorways and the like, notwithstanding that sides 21–24 may be bowed or arched for aesthetic or other reason or may be provided by a building or other structure that support antenna array 30.

Antenna array 30 includes a plurality of loop antennae 31, 32, 33, and 34 generally disposed in two orthogonal pair of opposing antennae so as to, in use, produce a three-dimensional electromagnetic field within passage 25. Objects 40 to be detected pass through passage 25 in a direction indicated by arrow 42 or are placed therein, and include a wireless article 44 which is also referred to as an RF tag, a smart card or an RFID tag. Antenna array 30 has substantial dimension in the direction of arrow 42, thereby having substantial dimension in all three orthogonal directions (X=width, Y=height, and Z=length), so as to produce a suitable electromagnetic field within passage 25.

As used herein with respect to the invention, "portal" generally refers to a defined space through which objects to be detected pass or may be placed, whereby such objects pass through or are placed within the electromagnetic field pattern of an antenna array, and so is generally the same as a "passage." "Passage" as used herein generally refers to the region or space defined by an antenna array in which it produces an electromagnetic field and/or in which an electromagnetic field produced therein is received by the antenna array. A portal or passage may or may not have specific structure, such as a doorway or corridor, but may be the detection region of the antenna array(s) associated therewith. Portal and passage also include enclosures, storage spaces and the like wherein objects to be detected may reside. The phrase "detection region" may be employed as a generic term to include all of the foregoing as well as any other application location utilizing the present invention.

As is well known, an antenna (and each antenna in an antenna array) is bilateral in that it will transmit an electromagnetic signal in response to an electrical signal applied to the antenna and in that it will produce an electrical signal in response to an electromagnetic signal received at the antenna. Often such electromagnetic signal is generally referred to as an RF signal, whether or not it is strictly at a frequency within a band of frequencies utilized for RF communication and/or signaling. The electromagnetic field within the portal, passage, door, enclosure, storage area and the like defined by the antenna array is sufficient for at least one of the antennas of the antenna array to communicate with a wireless article such as an RFID tag therein, irrespective of its orientation therein, and detect same.

As used herein with respect to the invention, any of "wireless article," "RFID tag," "RF tag," "tag," smart card" and the like generally refers to a device including a loop antenna of one or more turns coupled to an electronic device, wherein the electronic device both receives signals via the loop antenna and transmits signals via the loop antenna. The received signals with respect to the wireless article may include signals for controlling and/or operating the electronic device and/or for being stored in a memory associated therewith, whether embodied in the same or a separate electronic chip. The transmitted signals with respect to the wireless article may include information that is stored in the memory of or associated with the electronic device and may include information previously received and stored therein. It is noted that the "received signals" with respect to the wireless article are "transmitted signals" with respect to the antenna array, and that the "transmitted signals" with respect to the wireless article are "received signals" with respect to the antenna array.

Such tag or other wireless article may be part of the object to be detected/identified, or may be made on a rigid or flexible substrate that is placed with and/or attached to such object, such as by adhesive or a strap or tie or the like, or by being packaged therewith, either permanently or releasably, as may be desired for a particular application. Where the object is metallic or otherwise electrically conductive, the wireless article is typically spaced away from the object a sufficient distance, e.g., a few millimeters, to allow operation of its antenna for communication of signals.

Returning to FIG. 2, each of antennae 31–34 is a generally planar loop antenna with one or more turns disposed for maximum area, i.e. of antennae 31 and 33 are spaced apart parallel to the X-Z plane and antennae 32 and 34 are spaced apart parallel to the Y-Z plane, defining passage 25 in which each produces electromagnetic field. Antennae 31–34 may be energized to transmit and/or receive simultaneously, in pairs or in sequence, or may be energized for one transmitting while the other(s) receive, as is advantageous. The direction of the electromagnetic field produced by antenna array 30 is generally perpendicular to the direction 42 of travel of objects 40 to be detected and is most sensitive where tag 44 is oriented parallel to the direction 42 of movement. The antenna circuit of the wireless article is typically tuned for the frequencies of the transmission and detection signals.

Antenna array 30 includes an additional antenna loop 30s disposed at an angle with respect to antenna loops 31–34 to further define the detection region in which antenna loops 31–34 and additional antenna loop 30s transmit and/or receive electromagnetic signals. In particular, additional antenna loop 30s defines a loop through which an object 40 may pass. In other words, the conductor forming loop antenna 30s surrounds passage 25 so that an object 40 and the wireless article 44 associated therewith passing through passage 25 or placed in passage 25 becomes coupled thereto. Additional antenna loop 30s is disposed at an angle of between about 45° and about 135° with respect to loop antennas 31–34 for ensuring that the electromagnetic field patterns thereof include three mutually orthogonal components. Additional antenna loop 30s and processor 50 are coupled for communicating the transmitted and received signals therebetween.

RFID tag 44 on object 40 is generally planar and as illustrated happens to be oriented with the plane of its antenna substantially perpendicular to the direction 42 of its travel, wherein the field of an antenna, e.g., the field induced on such antenna, in the plane thereof tends to be largely in the direction parallel to travel direction 42. Typically, RFID tag 44 is a planar structure in which a planar loop antenna of one or more turns is provided on a suitable substrate, such as a metal foil antenna on a sheet of plastic or other suitable material, and is connected to an electronic device such as an integrated circuit also mounted on the substrate.

Figure 3:
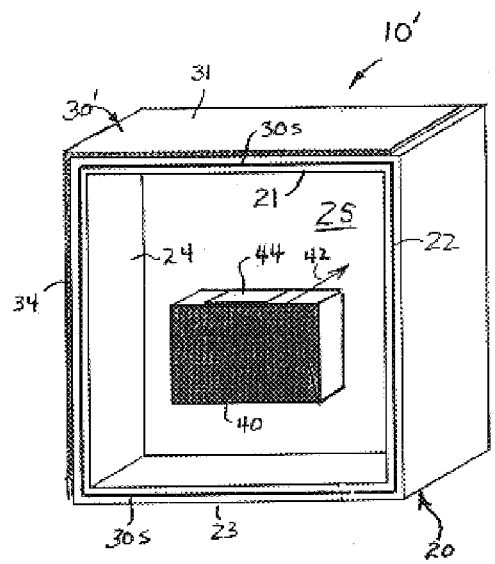

FIG. 3 is an isometric view schematic diagram of an exemplary detection portal 10 including an antenna array 30', in accordance with the invention, or other region, space or enclosure. Antenna array 30' is disposed with antenna 31 on side 21 and antenna 34 on side 24 of portal 20 and wraps around the corner between sides 21 and 24, thereby to define portal 10 and passage 25. RFID tag 44 on object 40 is generally planar and happens to be oriented with the plane of its antenna substantially parallel to the direction 42 of its travel, wherein the field of an antenna in the plane thereof tends to be largely in the direction perpendicular to travel direction 42. Antennas 31, 34 are oriented at an angle between about 45° and 90° with respect to each other, i.e. are skewed or tilted, so as to better couple to RFID tag 44 over a wider range of orientations of tag 44.

Antenna array 30' also includes an additional antenna loop 30s disposed at an angle between about 45° and about 135° with respect to antenna loops 31, 34 to further define the detection region in which antenna loops 31, 34 and antenna loop 30s transmit and/or receive electromagnetic signals including three mutually orthogonal components. In particular, antenna loop 30s surrounds passage 25 so that an object 40 and the wireless article 44 associated therewith passing through passage 25 or placed in passage 25 becomes coupled thereto, as described above. Antenna loop 30s is coupled to processor 50 via filter 36 for communicating the transmitted and received signals therebetween.

Antennae 31, 34 may be sequentially activated, e.g., about 2–20 times per second, or more frequently, if useful, so as to eliminate any interference therebetween. The arrangement of antenna array 30' is suitable where, for example, the width of portal 10 is greater, and may be employed in conjunction with a similar antenna array (not shown) on sides 22, 23.

Figure 4:
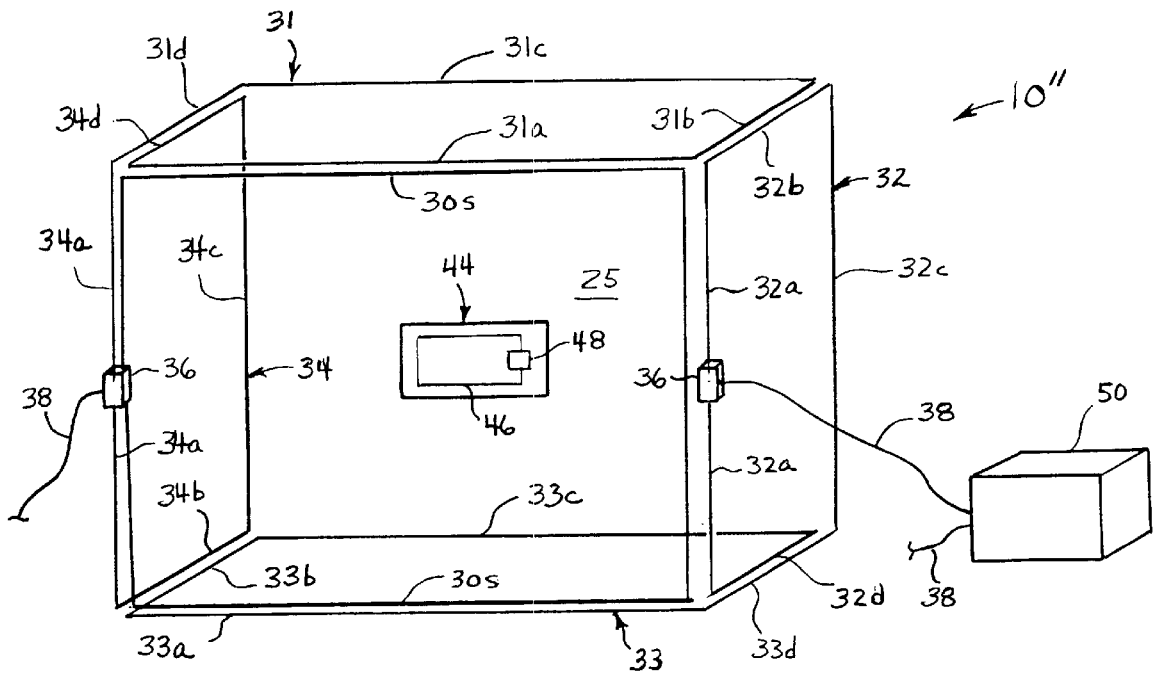
FIG. 4 is an isometric view schematic diagram of an exemplary antenna array, in accordance with the invention.

FIG. 4 is an isometric view schematic diagram of an exemplary antenna array 30" defining a portal 10" having passage 25 therethrough in accordance with the invention. A first antenna 31, 34 comprises a first loop 31 having conductors 31a, 31b, 31c, 31d defining the periphery of the top of portal 10" and a second loop 34 having conductors 34a, 34b, 34c, 34d defining the periphery of an adjacent side of portal 10". While all of conductors 31a–31d and 34a–34d are connected in series to form one series circuit, conductors 31d and 34d crossover from the entrance to the exit planes of passage 25 so that electromagnetically they form two loops of smaller dimension. The ends of loop 31–34 couple to filter 36 which couples loop 31–34 via coaxial cable 38 to card reader and processor 50 and provides a better signal for decoding, e.g., by matching of electrical characteristics therebetween, if necessary.

In like manner, a second antenna 32, 33 comprises a first loop 33 having conductors 33a, 33b, 33c, 33d defining the periphery of the bottom of portal 10" and a second loop 32 having conductors 32a, 32b, 32c, 32d defining the periphery of an adjacent side of portal 10". While all of conductors 32a–32d and 33a–33d are connected in series to form one series circuit, conductors 32d and 33d crossover from the entrance to the exit planes of passage 25 so that electromagnetically they form two loops of smaller dimension. The ends of loop 32–33 couple to filter 36 which couples loop 32–33 via cable 38 to card reader and processor 50 and provides a better signal for decoding, e.g., by matching of electrical characteristics therebetween, if necessary.

Antenna array 30" also includes an additional antenna loop 30s disposed at an angle between about 45° and about 135° with respect to antenna loops 31–34 to further define the detection region in which antenna loops 31–34 and antenna loop 30s transmit and/or receive electromagnetic signals including three mutually orthogonal components. In particular, antenna loop 30s surrounds passage 25 so that an object 40 and the wireless article 44 associated therewith passing through passage 25 or placed in passage 25 becomes coupled thereto, as described above. Antenna loop 30s is coupled to processor 50 via filter 36 for communicating the transmitted and received signals therebetween.

It is noted that a single loop of a physical conductor is utilized to form each of the two-loops of loop antennas 31–34 and 32–33, and so loops 31–34 are in fact a single loop antenna and loops 32–33 are also a single loop antenna. Because the two loops of either of loop antennas 31–34 or 32–33 are disposed at an angle with respect to each other, each loop provides an electromagnetic field having at least two mutually orthogonal components. Thus, the combination of loop antenna 30s and either of loop antennas 31–34 or 32–33 is sufficient to provide an electromagnetic field having three mutually orthogonal components, in accordance with the invention.

In one exemplary embodiment of the invention, each of the conductors 30s, 31a–31d, 32a–32d, 33a–33d and 34a–34d is a braided conductor such as the shield conductor of a coaxial cable or Litz wire. Any suitable conductor of suitably low resistance can be utilized, e.g., with appropriate width, thickness and/or diameter. Cable 38 is preferably a coaxial cable or other suitable electrical conductor. Cable 38 couples RF signals from processor 50 to antennas 31–34 to be transmitted to RFID tags 44, if any, proximate portal 10" and also couples RF signals transmitted by RFID tags 44, if any, proximate portal 10" and received by antennas 31–34 to processor 50.

The distance at which detection of a wireless article occurs is related to the strength of the electromagnetic field induced at the article by the antenna array. Thus, a generally higher power level increases the detection distance. For example, increasing the power from 5 watts to 25 watts can increase the detection distance from about ⅓ meter (about 1 foot) to about 1 meter (about 3 feet).

Processor 50 includes, for example, a conventional RF card reader/writer, such as those available commercially from many manufacturers, such as Datatronic Kodiertechnik GmbH of Germany, Philips Electronics/Infineon of Eindhoven, The Netherlands or Siemens of Munich, Germany. Processor 50 may also include switches and control circuitry therefor for selectively connecting and disconnecting antennas 31–34 and 32–33 sequentially and/or alternately to the card reader/writer of processor 50, thereby to enable a single card reader/writer to be operated with a plurality of antennas.

A typical reader includes a receiver and a decoder function for providing information (data) received via an antenna, e.g., a loop antenna, from a wireless tag. Such reader may also include a write function for writing information via the antenna to the wireless tag 44. Such reader and/or reader/writer typically receives and/or transmits signals at a frequency, e.g., at about 13.56 MHZ, 125 kHz, 915 MHZ or 2.45 GHz. Signals communicated between the reader/writer and the tag interact with the tag for initiating and/or controlling operation of the tag, and/or for transmitting information to the tag (the "writing") or for retrieving information from the tag (the "reading"). Typically, the signal from the reader/writer activates and controls the tag which returns a signal in response thereto, such returned signal including, for example, an identifying number or other identifier, or other useful information or data.

Typically, the distance at which a wireless tag may be read by the reader of processor 50 (the "read/write distance") increases with the power of its transmitted signal, which may be in a typical power level range of about 1–100 watts. The read/write distance also increases with the size of the antenna of the wireless tag and the particular electronic device therein. Plural antennas utilized with a reader increase the read/write distance. For example, if two antennas each having a read/write distance of 20 inches (about 0.5 m) are disposed at opposite sides of a portal or gate, as illustrated, for example, in FIGS. 2 and 4, the portal or gate may be up to about 40 inches (about 1 m) wide. Similarly, the usable height of the portal or gate is increased where two antenna are disposed at the top and bottom thereof, also as illustrated, for example, in FIGS. 2 and 4. Such plural antennas may be utilized with a single reader/writer or with plural readers/writers, as convenient.

A wireless article 44 includes a loop antenna 46 and an electronic device 48 including a memory whereby electromagnetic signals received by loop antenna 46 are provided to electronic device 48 and signals produced by electronic device 48 are transmitted via loop antenna 46. Processor 50 processes transmitted signals of a type adapted to be received by electronic device 48 via loop antenna 46 and processes received signals of a type adapted to be produced by electronic device 48. Suitable RFID tags or cards 44 are available from many sources.

A preferred card available from Avante International Technology, Inc. located in Princeton Junction, N. J., utilizes the I-Code chip electronic device available from Philips Electronics located in Eindhoven, The Netherlands. Suitable integrated circuits for such cards also include the "Tag-It" devices available from Texas Instruments of Texas, United States, and the "Pico-Tag" available from Inside Technology of France, as well as similar devices available from Microchip company of Phoenix, Ariz. Each of the foregoing operate at a frequency of about 13.56 MHZ which is preferred because it does not present a microwave hazard to personnel and allows communication between the RFID tag and the antenna at a suitable distance. Tags and devices at other frequencies, such as those operating at about 915 MHZ available from Intermec company of Washington, and those operating at about 2.45 GHz available from Single Chip Systems of San Diego, Calif. Preferably, the electronic device is of the type that operates without a battery, as do many of those referred to above.

FIGS. 5A and 5B are isometric view schematic diagrams of exemplary antenna arrays 30*a*, 30*p* including non-orthogonal antennas, in accordance with the invention. Antenna array 30*a* of FIG. 5A may be utilized, for example, with respect to relatively larger passages such as those for personnel or vehicles, and antenna array 30*p* of FIG. 5A may be utilized, for example, with respect to relatively smaller passages 25 such as those for identifying and/or tracking objects such as baggage or packages.

Portal 10*a* of FIG. 5A is defined by an antenna array 30*a* which includes three loop antennas 30*s*, 30*h*, 30*v* disposed in relation to each other to define passage 25 through which or into which an object associated with a wireless article or RFID tag 44 may pass (e.g., in the ±Z direction) or be placed. Antenna array 30*a* includes loop antenna 30*s* in the X-Y plane surrounding passage 25, for example, near one of an entrance or exit thereof. Loop antenna 30*v* is skewed or diagonally positioned at an angle of up to about 45° with respect to the X-Y plane (i.e. is rotated about the X axis) and loop antenna 30*h* is skewed or diagonally positioned at an angle of up to about 45° with respect to the X-Y plane (i.e. is rotated about the Y axis). Thus, each of loop antennas 30*s*, 30*v*, 30*h* is skewed with respect to the others thereof and at least two are skewed with respect to the normal travel direction of an object in passage 25.

For a typical baggage or package passage having a passage opening of about 0.9 m by 0.9 m (about 3 feet by 3 feet), and a passage length or depth of about 0.9 m (about 3 feet), satisfactory detection of RFID tags is provided with a transmitted carrier signal power level in the range of about 20–30 watts.

Antenna array 30*a* is also suitable for smaller passages and for larger passages, and the operating power level is appropriately adjusted. For example, for a typical larger passage, such as one suitable for the size of a typical shipping container, having a passage opening of about 3 m by 3 m (about 10 feet by 10 feet), and a passage length of about 3 m (about 10 feet), satisfactory detection of RFID tags is provided with a transmitted carrier signal power level in the range of about 30–60 watts.

Portal 10*p* of FIG. 5B is defined by antenna array 30*p* which includes six loop antennas 30*s*, 30*v*, 30*h*, 30*t*, 32, 34 disposed in relation to each other to define passage 25 through which or into which an object 40 associated with a RFID tag 44 may pass (in the ±Z direction) or be placed. Antenna array 30*p* includes loop antenna 30*s* in the X-Y plane surrounding passage 25, loop antenna 30*t* in the X-Z plane at one of the top and bottom of passage 25, and a pair of opposing loop antennas 32, 34 in the Y-Z plane at opposing sides of passage 25. In addition, loop antenna 30*v* is skewed or diagonally positioned at an angles up to about 45° with respect to the X-Y plane (i.e. is rotated about the X axis) and loop antenna 30*h* is skewed or diagonally positioned at an angle up to about 45° with respect to the X-Y plane (i.e. is rotated about the Y axis).

Thus, noting that loop antennas 30*s*, 30*t*, 32, 34 are either perpendicular to each other or parallel, each of loop antennas 30*v*, 30*h* is skewed with respect to each of the other loop antennas 30*s*, 30*t*, 32, 34 and at least two loop antennas 30*v*, 30*h* are skewed with respect to the normal travel direction of an object in passage 25.

Antenna array 30*p* is suitable for passages of various sizes, and the operating power level is appropriately adjusted. For example, a typical personnel doorway, access, egress or portal that is compliant with the United States Americans with Disabilities Act (ADA), which is of sufficient width for easy passage of a wheelchair, has a passage opening of about 1.2 m wide by 2.1 m (about 4 feet by 7 feet), and a passage length of about 0.9 m (about 3 feet). The loops of loop antennas 30*s*, 30*v*, 30*h*, 32 and 34 are typically in the range of about 6–9 m (about 20–30 feet) long, and the side loop antennas 32, 34 read an RFID tag 44 at a distance of about 0.9 m (about 3 feet). Satisfactory detection of RFID tags is provided with a transmitted carrier signal power level in the range of about 30–60 watts provided by the reader/writer.

Antenna arrays 30*a*, 30*p* of FIGS. 5A and 5B are each operatively coupled to a processor 50 for reading information from an RFID tag 44 and/or for storing information therein, as may be desired. Preferably, such coupling includes a filter 36 and/or a processor/sequential switch 50 operative for selectively activating and/or sequencing antennas 30*s*, 30*v*, 30*h*, 30*t*, 32, 34 in like manner to that described above, for example, in relation to FIGS. 2–4. Filter 36 and/or switch 50 may be located at any convenient position in the loop defined by each of the antennas. The switching rate need be only high enough that the electromagnetic field direction be switched through its various orientations at a rate faster than an object and the RFID tag associated therewith can physically move through the passage. Typically, an activation time in the range of about 0.01–0.5 seconds for each loop antenna is satisfactory for sampling and reading an RFID tag, with a shorter time being employed where the objects move through the passage more quickly.

In an embodiment employing, for example, three antennas the three antennas are alternatingly selectively connected to and operated with a single card reader/writer at the rate of 6 times per second so that out of each 167 millisecond cycle, each antenna is connected for about 55 milliseconds and disconnected for about 112 milliseconds in alternating fashion sequentially with the other antenna. In an embodiment employing, for example, ten antennas and sequenced at a rate of 10 times per second so that for each 100 millisecond cycle, each antenna is connected for about 10 milliseconds and is disconnected for about 90 milliseconds in alternating fashion sequentially with the other antennas.

As a result, each of the loop antennas 30$s$, 30$v$, 30$h$, 30$t$, 32, 34 is disposed at an angle between about 45°–90° with respect to the direction of movement, generally along the ±Z axis, of object 40 so as to reliably communicate with an RFID tag 44 associated therewith irrespective of the orientation of the RFID tag within passage 25. Such communication in a properly arranged embodiment according to the invention is capable of almost 100% reading accuracy, if not actual 100% accuracy.

Such antenna array arrangements as antenna arrays 30$a$, 30$p$ are also suitable for being disposed in storage bays, storage containers, closets, file rooms, shipping containers and other containers or enclosures which, when coupled to a processor 50, can identify and/or inventory the articles and objects in such bay or container or enclosure. Thus, an identification, inventory and/or tracking system is provided that is operative without unpacking or otherwise requiring access to or removing the articles and objects from the container or enclosure in which they are located.

Figure 6:
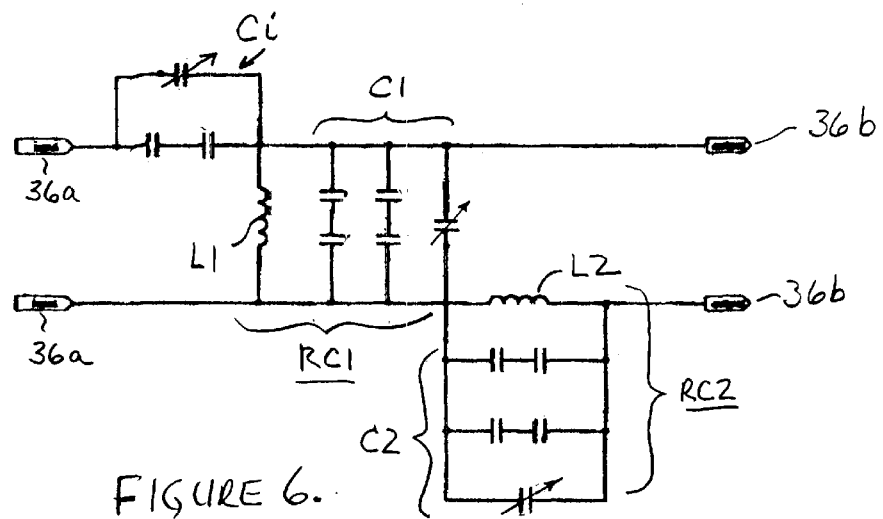
FIG. 6 is a schematic diagram of an exemplary filter for use with the antenna arrays described herein.

FIG. 6 is a schematic diagram of an exemplary filter 36 for use with the antenna arrays described herein. Filter 30 includes a pair of input terminals 36$a$ and a pair of output terminals 36$b$. Capacitor Ci in series with one of input terminals 36$a$ is a capacitance network typically including two series-connected fixed-value capacitors in parallel with a variable capacitor for adjusting the filter characteristics of filter 36. Filter 36 also includes resonant circuit RC1 coupled in parallel with the signal path between input and output terminals 36$a$, 36$b$, and resonant circuit RC2 coupled in series with the signal path at an output terminal 36$b$. Capacitor Ci and resonant circuits RC1, RC2 are tuned to resonate substantially at the carrier frequency, e.g., 13.56 MHZ, to provide the best detector response.

Resonant circuit RC1 includes a parallel resonant circuit including an inductor L1 and a capacitor C1 in parallel. Capacitor C1 is a capacitance network typically including two sets of two series-connected fixed-value capacitors in parallel and in parallel with a variable capacitor for adjusting the resonance characteristics of resonant circuit RC1. Typically, resonant circuit RC1 is tuned to a frequency to provide best detection response with respect to the carrier frequencies at which a reader/writer of processor 50 and a wireless article 44 communicate.

Resonant circuit RC2 includes a parallel resonant circuit including an inductor L2 and a capacitor C2 in parallel. Capacitor C2 is a capacitance network typically including two sets of two series-connected fixed-value capacitors in parallel and in parallel with a variable capacitor for adjusting the resonance characteristics of resonant circuit RC2. Typically, resonant circuit RC2 is tuned to a frequency to provide best detection response with respect to the carrier frequencies at which a reader/writer of processor 50 and a wireless article 44 communicate.

In combination, capacitor Ci and resonant circuits RC1, RC2 enhance the coupling of desired signals from processor 50 via antenna array 30 to an RFID tag 44 disposed within the electromagnetic field pattern of antenna array 30 and from an RFID tag 44 so disposed to processor 50 via antenna array 30, and impede the coupling of undesired signals, such as signals at harmonics of the desired signals or at other frequencies.

Figure 7:
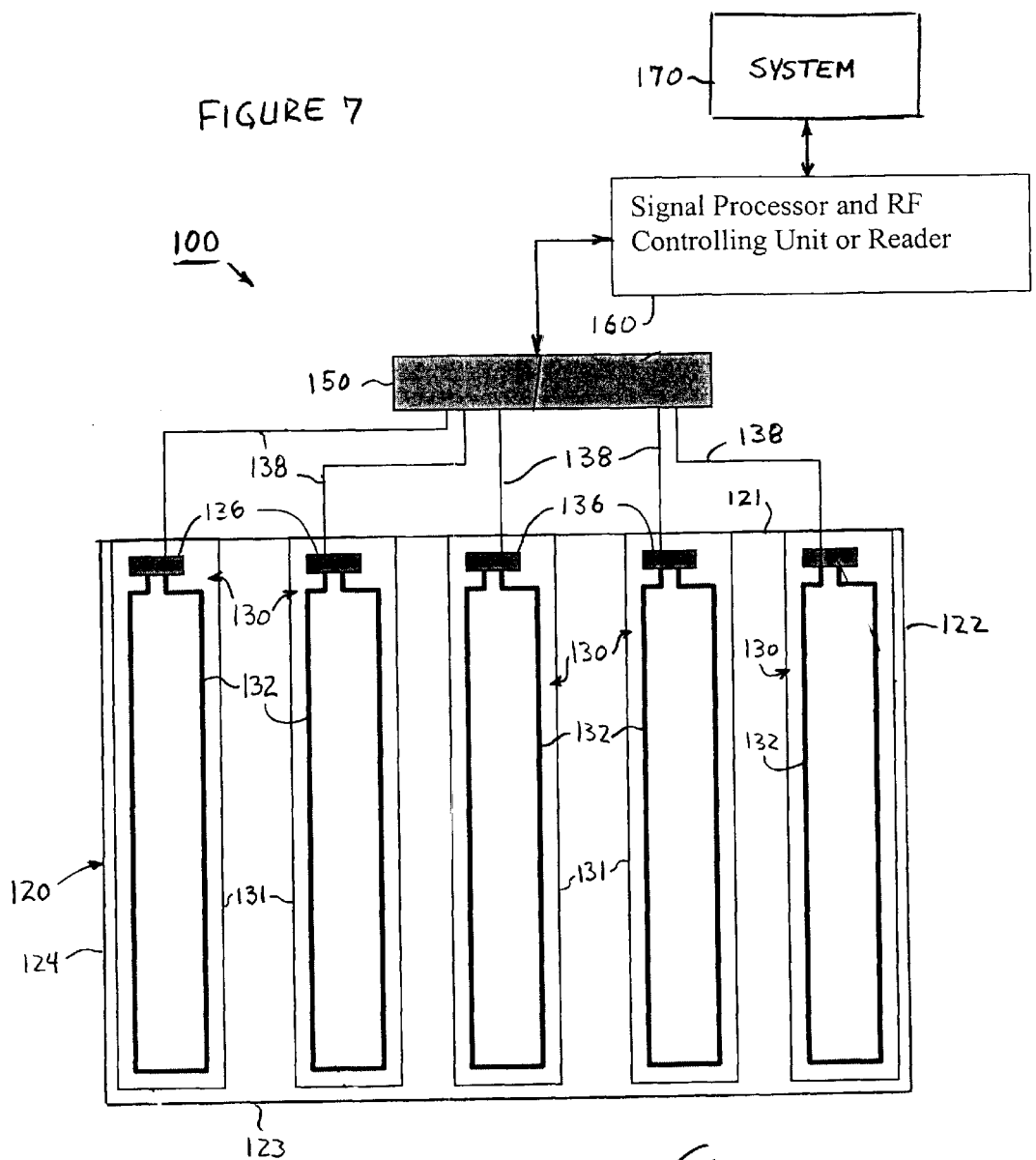
FIG. 7 is an elevation view schematic diagram of an exemplary detection system having a detection portal including an exemplary partible curtain antenna array, in accordance with the invention.

FIG. 7 is an elevation view schematic diagram of an exemplary detection system 100 having a detection portal 120 including an exemplary partible "curtain-type" antenna array, in accordance with the invention. The curtain-type antenna array includes a plurality of hanging flexible antennas 130 that hang from the top 121 of portal 120 (doorway 120) in similar manner to the flexible plastic panels or strips of a conventional hanging flexible doorway as is used in warehouses and the like where it is desired to easily pass through a doorway without having to open and close a large door, such as a swinging door or an overhead door, and yet provide some degree of closure to keep out the weather and the like.

Typically, each panel or strip 131 is made of a tough, flexible plastic such as polyvinyl chloride (PVC) or other suitable plastic substrate and is of a length to reach or almost reach the bottom 123 of the doorway/portal 120. The panels 131 at the left and right extremes are preferably proximate the sides 122, 124 of doorway/portal 120, and, over the width of doorway/portal 120, intermediate adjacent panels 131 are hung substantially edge-to-edge from the top of the passageway 120 so as to touch or slightly overlap or be close to one another. As a result, the plurality of flexible substrates 131 substantially cover passageway 120, and antenna loops 132 are disposed on a sufficient number of the flexible substrates 131 so as to transmit and/or receive electromagnetic signals to a wireless article 44 proximate passageway 120.

In accordance with the invention, an array of antennas 130 is formed by antenna loops 132 on the flexible panels 131 of the partible curtain-type doorway, e.g., a personnel or vehicle entrance to a building or other facility. Each antenna loop 132 is formed of a metal conductor, such as a strip of copper or aluminum conductor, attached to panel 131, such as by an adhesive or by heat bonding, and may be laminated between two sheets of the substrate 131 material that are laminated together either adhesively or by heat to enclose antenna loop 132 therebetween. The conductor of antenna loop 132 typically extends along a substantial part of the length of panel 131 and the sides of antenna loop 132 are separated by a substantial part of the width of panel 131 so as to define a loop of suitable size for operation at the frequency selected for communication between antenna 130 and any wireless articles 44 in proximity thereto.

It is noted that one or more additional antennas and/or antenna arrays may be employed in conjunction with the array 130 of antenna loops 132, and the additional antennas may be skewed 45° or more with respect to antenna loops 132, so as to provide additional detection assurance for certain orientations of the wireless article, or for providing coverage of additional space, such as an enclosure, storage space or the like. Such may include an additional antenna loop surrounding the doorway or passage 120 in like manner to loop antenna 30$s$ described above or by additional antenna loops 132 suspended in skewed relationship to antenna loops 132 as illustrated. In particular, a surrounding antenna loop surrounds passage 120 so that an object and the wireless article associated therewith passing through passage 120 or placed in passage 120 becomes coupled thereto, as described above.

Such surrounding or skewed loop antenna may be disposed at an angle between about 45° and about 135° with respect to antenna loops 132 to further define the detection region in which antenna loops 132 and such surrounding/skewed antenna loop transmit and/or receive electromagnetic signals including three mutually orthogonal components. Such surrounding and/or skewed antenna loop or loops is or are coupled to processor 160 via filter 136 and switch 150 for communicating the transmitted and received signals therebetween.

The width and thickness of the metal conductor of antenna loop 132 is selected for suitable resistance and conductivity for proper operation. Thus, the shape of antenna loop 132 tends to follow or be proximate the periphery of panel 131 which provides a supporting substrate for antenna 130. Alternatively, conductor 132 may be a deposited strip of an electrically-conductive flexible adhesive such as type TP8090 available from AI Technology, Inc. located in Princeton Junction, N. J.

Each antenna 130 is selectively coupled to a processor 160 via switching circuit 150 in predetermined order and/or sequence and/or combinations. Each antenna 130 is coupled to switching circuit 150 via a filter 136 and a cable 138 for coupling RF signals therebetween for communicating and/or signaling with wireless articles 44 proximate portal 120. Filter 130 provides suitable matching of electrical characteristics for providing a better signal for decoding by the reader/writer of processor 160, which reader/writer receives and decodes signals from tag 44 and/or encodes and transmits signals to tag 44. Processor 160 further controls the operation of switches of switching circuit 150 for selectively coupling ones of antennas 130 to processor 160, for example, in sequence or alternatingly. Cable 138 is a coaxial cable or other suitable conductor for the signals passing between processor 160 and antennas 130.

Processor 160 couples to system 170 which utilizes information (data) produced by the reader/writer of processor 160 in response to wireless tags 44 being in proximity to antenna 130, and may provide information (data) to the reader/writer of processor 160 for initiating or controlling operation of a wireless tag 44 in proximity to antenna 130, or both. System 170 may be any apparatus that may utilize information (data) provided, received and/or exchanged with a wireless tag for any desired purpose, for example, for inventory control, access control, electronic gates, baggage and/or package tracking, vehicle toll collection (e.g., E-Z-PASS, E-PASS and the like), theft prevention, retailing, vehicle monitoring and other applications as desired.

The array of antennas 130 is very effective in coupling to wireless articles (tags) 44 because the objects, such as packages, boxes and the like, to which the tags 44 are affixed part the panels 131 when passing through portal 120, thereby causing the movement of one or more of antennas 130. Because antennas 130 so move relative to tags 44, their orientation with respect to the wireless tag 44, and that of the electromagnetic fields produced thereby, changes and it is almost impossible for the tag 44 to pass through portal 120 without being effectively coupled to one or more of antennas 130, thereby to reliably be detected. In other words, the relative orientations of the antenna patterns of the antennas 130 and of the antennas of tags 44 changes between various orientations ranging from perpendicular or orthogonal to alignment, thereby covering all orientations. Further, because the antennas 130 are sequentially operative due to the action of switching circuit 150, interference and other undesirable interaction between ones of antennas 130 is eliminated, thereby enabling more reliable communication between the reader/writer of processor 160 and the electronic device of tag 44.

It is noted that panels 131 between those of panels 131 having an antenna loop 132 are not shown in FIG. 6 which approximates an arrangement where every other one of panels 131 has an antenna loop 132. Alternatively, every panel 131 may have an antenna loop or less than every other panel 131 may have an antenna loop 132 as may be appropriate in a given portal 120 for satisfactory operation.

Figure 8:
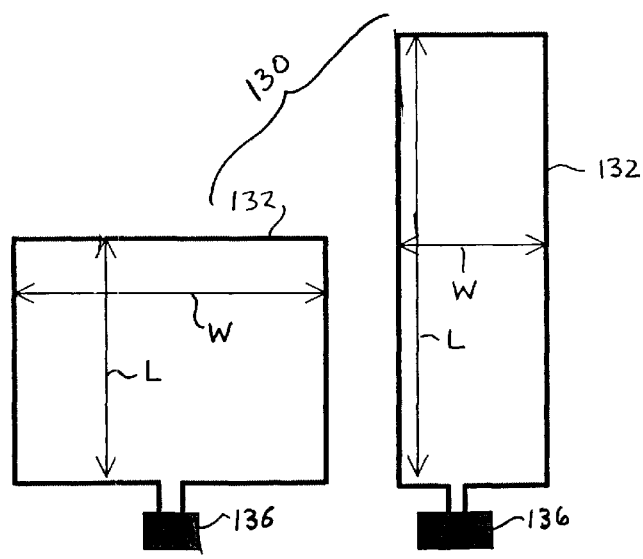
FIG. 8 is a plan view schematic diagram illustrating antennas of different aspect ratios suitable for use in accordance with the invention.

FIG. 8 is a plan view schematic diagram illustrating antennas 130 of different aspect ratios suitable for use in accordance with the invention. Specifically, loop conductor 132 defines a substantially planar loop having a width W and a length L measured from a side including filter 136. Typically filter 136 connects to loop 132 at a position along one of the sides thereof, most typically toward the center of such side. For a given overall length L, the basic efficiency of the antenna as indicated by the distance perpendicularly away from the plane of loop 132 at which a tag 44 can be read and written to (the "read/write distance") is substantially the same. For example, an antenna loop 132 having a length of four feet (about 1.2 m) and a resistance of 0.5 ohm when formed to define a square portal having a width and a length of one foot (about 0.3 meter), and when operated with a reader/writer having a power in the range of about 2.5–5 watts, reads a typical I-Code card at a distance of about 2 feet (about 0.6 meter).

For an antenna loop 132 having a width of about 6–9 inches (about 0.15–0.23 meter), when the length L is doubled to 8 feet (about 2.4 m), tripled to 12 feet (about 3.6 m) and quadrupled to 16 feet (about 4.8 m), the read/write distance is less than 12 inches (about 0.3 m), 6 inches (about 0.15 m) and 2 inches (about 0.05 m), respectively. The resistance of antenna loop 132 should be kept low, e.g., less than one ohm, to avoid decrease in the read/write distance, and a flat or ribbon conductor is preferred.

Typically, to increase the read/write distance, the overall length of the antenna may be increased along with the power level. For example, a power level of about 30 watts can provide a read/write distance of over 1.5 meters (over 4½ feet).

FIG. 9 is a plan view schematic diagram illustrating an exemplary elongated aspect ratio antenna 130 and an exemplary plural antenna 130' suitable for use in accordance with the invention. Elongated aspect ratio antenna 130 is, for example, as described above in relation to FIG. 6. Elongated aspect ratio antenna 130' is, for example, twice as long as is antenna 130, and comprises two antenna loops 132a and 132b connected in parallel by filter 136' for coupling to cable 138. Antenna 130' may be operated at the same or at a lower power level than antenna 130, and yet provide the same or an increased read/write distance perpendicular to the plane of antenna loops 132a, 132b.

Two or more antenna loops 132 may be connected in parallel via filter 136' such as two or four loops 132 to provide an antenna of double or quadruple the length of antenna 130, or otherwise arrayed to otherwise extend or shape the read/write region thereof. It is noted that such parallel-coupled antennae are properly interconnected by filter 136' the electrical characteristics of which are tailored to the particular number and characteristics of the respective antenna loops 132, 132a, 132b, and so the plural antennae do not need to be switched as described above, e.g., in relation to FIG. 4, but may be, if desired.

FIG. 10 is an elevation view schematic diagram of an exemplary detection system 100 employing a detection portal including an exemplary partible curtain antenna array 130 as illustrated in FIG. 6 and an exemplary elongated plural antenna 130' as illustrated in FIG. 8, in accordance with the invention. In all respects, the embodiment of FIG. 9 is arranged and operates in like manner to system 100 and antenna 130, 130' as described above. System 100 may include plural antenna 130 in a portal, or plural antennas 130' in a portal, or a plurality of portals of either or both antenna types, as may be necessary and/or convenient with respect to a particular application for system 100. Moreover, the portal thereof need not be a conventional portal such as a doorway, but may be defined by the array of antennas 130, 130' disposed by hanging or other attachment to physical structure at the utilization location.

While the present invention has been described in terms of the foregoing exemplary embodiments, variations within the scope and spirit of the present invention as defined by the claims following will be apparent to those skilled in the art. For example, while the antennas and portals described herein are generally rectangular, the antennas and portals may be of any desired shape, whether regular or irregular, as may be necessary and/or convenient in a particular application or utilization location. In general, dimensions, shapes and other quantities are not and need not be exact, but may be approximate and/or larger or smaller, as desired, reflecting tolerances, conversion factors, rounding off, measurement error and the like, whether or not stated to be "about," and "about" includes at least the foregoing.

Antennas and antenna arrays according to the invention may be employed with utilization systems for any one or more of toll collection, object identification, stolen object identification, theft prevention, object tracking, retailing, package tracking, baggage tracking, inventory tracking, factory and/or warehouse inventory, security identification, and/or access control. Further, the tag information may simply be displayed on a display device to identify the object tagged, as might be desired in connection with a passenger baggage system or a personnel identification system.

The detection region may include any one or more of a portal, a passage, a passageway, a doorway, an access, an egress, a security gate, a toll gate, an electronic gate, a retail check-out station, a corridor, a tunnel, a conveyor, a baggage cart, an enclosure, a storage space, a container, a shipping container, a pallet, a cargo bay, a truck, a trailer, a loading area, a warehouse, and any other suitable arrangement.

Further, for a typical smart-card-size tag available from Avante International Technology employing the Philips I-CODE electronic chip and a Philips compatible reader/writer with its power increased from about 5 watts to about 30 watts, tags may be read at distances of about 1–2 meters which is suitable for vehicle toll collection where the flexible tag is placed near a side edge of the vehicle windshield glass. Where fixed reader antennae are placed at both sides of the vehicle portal or gate, the gate width can be increased up to more than about 4 meters. Were such tags to be routinely placed in vehicles or other objects, e.g., at manufacture or sale or in a registration or inspection decal, such antennae portals or gates can be coupled to a system containing the identifiers of stolen vehicles and objects for identifying stolen vehicles or objects when they pass through such portals or gates.

It is noted that the objects to be detected need not pass through the portal or passageway or be in the enclosure one-by-one, but may pass by or enter in groups, such as groups of people having identification badges passing an access or egress control location or a pallet or box of objects, whether carried by hand or mechanically, such as by a fork-lift or truck, and/or they may remain in the portal or passageway or enclosure for a period of time.

What is claimed is:

1. An antenna array for detecting a wireless article associated with an object comprising:

a plurality of flexible substrates each defining peripheral edges;

a plurality of antenna loops each disposed on one of the flexible substrates, wherein the flexible substrates are adapted to be hung to define a detection region in which said plurality of antenna loops transmit and receive electromagnetic signals and through which nix the object and associated wireless tag may pass, wherein each antenna loop includes a single turn of a strip conductor disposed on the flexible substrate along the peripheral edges thereof, and wherein each antenna loop transmits and receives electromagnetic signals;

a processor for causing electromagnetic signals to be transmitted and for processing at least received signals for detecting the wireless article associated with the object; and means coupling said plurality of antenna loops and said processor for coupling at least the transmitted and received signals therebetween.

2. The antenna array of claim 1 wherein said plurality of flexible substrates are elongated and are hung substantially edge-to-edge from a top of a passageway through which an object may pass.

3. The antenna array of claim 2 wherein said plurality of flexible substrates substantially cover the passageway, and wherein said plurality of antenna loops disposed on said plurality of flexible substrates are adapted to transmit and receive electromagnetic signals to a wireless article proximate the passageway.

4. The antenna array of claim 1 wherein said means for coupling includes at least one of a filter and a switch for selectively connecting said plurality of antenna loops and said processor.

5. The antenna array of claim 1 wherein said processor processes transmitted signals and said received signals, wherein said transmitted signals are coupled to said plurality of antenna loops to be transmitted thereby.

6. The antenna array of claim 5 in combination with a wireless article adapted to be associated with an object, said wireless article including a ioop antenna and an electronic device including a memory, wherein said processor processes transmitted signals of a type adapted to be received by the electronic device via the loop antenna and processes received signals of a type adapted to be produced by the electronic device.

7. The antenna array of claim 6 wherein the signals received by the electronic device one of activate, operate, or control the electronic device and cause storing of information in the memory or reading of information from the memory.

8. The antenna array of claim 1 in combination with:

an additional antenna loop disposed at an angle with respect to said plurality of antenna loops to further define the detection region in which said plurality of antenna loops and said additional antenna loop transmit and/or receive electromagnetic signals, wherein said additional antenna loop defines a loop through which an object may pass; and means coupling said additional antenna loop and said processor for coupling at least the received signals therebetween.

9. The antenna array of claim 8 wherein said additional antenna loop is disposed at an angle of between about 45° and about 135° with respect to said plurality of antenna loops.

10. The antenna array of claim 1 in combination with a wireless article adapted to be associated with an object, said wireless article including a loop antenna and an electronic device including a memory, wherein said processor processes received signals of a type adapted to be produced by the electronic device.

11. The antenna array of claim 1 in combination with a utilization system operable in conjunction with the transmitted signals and the received signals.

12. The antenna array of claim 1 wherein said utilization system includes one of toll collection, object identification, stolen object identification, theft prevention, object tracking, package tracking, baggage tacking, retailing, inventory tracking, factory and/or warehouse inventory, security identification, and/or access control.

13. The antenna array of claim 1 wherein said detection region includes at least one of a portal, a passage, a passageway, a doorway, an access, an egress, a security gate, a toll gate, an electronic gate, a retail check-out station, a corridor, a tunnel, a conveyor, a baggage cart, an enclosure, a storage space, a container, a shipping container, a pallet, a cargo bay, a truck, a trailer, a loading area, and a warehouse.

14. One of a plurality of flexible antenna for detecting a wireless article associated with an object comprising an elongated flexible substrate adapted to be suspended from one end thereof and having opposing broad surfaces defining peripheral edges, a strip of electrically conductive material disposed on at least one of the broad surfaces proximate-the-periphery along the peripheral edges of said flexible substrate to define a single-turn loop, and a coupler to which respective ends of said strip of electrically conductive material are coupled for transmitting and receiving electromagnetic signals, wherein the flexible antenna flexes when contacted by the object.

15. The antenna of claim 14 wherein said elongated flexible substrate comprises two sheets of a flexible material, and wherein said strip of electrically conductive material is laminated between said two sheets of flexible material.

16. The antenna of claim 14 wherein said strip of conductive material includes one of copper, aluminum and electrically-conductive flexible adhesive.

17. An antenna array for detecting a wireless article associated with an object comprising:
a plurality of elongated flexible substrates each having opposing broad surfaces defining peripheral edges, wherein the flexible substrates are adapted to be suspended from one end thereof to define a detection region;
on given ones of said flexible substrates, a strip of electrically conductive material disposed on at least one of the broad surfaces of the given ones of said flexible substrate along the peripheral edges thereof to define a single-turn loop;
associated with the given ones of said flexible substrates, a coupler to which respective ends of said strip of electrically conductive material on the given one of said flexible substrate are coupled;

thereby providing a plurality of single-turn antenna loops disposed on the given ones of said flexible substrates in the detection region in which each of said plurality of single-turn antenna loops transmit and receive electromagnetic signals;

a processor for processing at least received signals for detecting the wireless article associated with the object; and means coupling the couplers of said plurality of antenna loops and said processor for coupling at least the received signals therebetween.

18. The antenna array of claim 17 wherein said plurality of flexible substrates are elongated and are hung substantially edge-to-edge from a top of a passageway.

19. The antenna array of claim 17 wherein each of the given ones of said elongated flexible substrate comprises two sheets of a flexible material, and wherein said strip of electrically conductive material is laminated between said two sheets of flexible material.

20. The antenna array of claim 17 comprising:
on at least one of the given ones of said flexible substrates, a second strip of electrically conductive material disposed on at least one of the broad surfaces of the at least one of the given ones of said flexible substrate proximate the periphery thereof to define a second loop, wherein respective ends of said second strip of electrically conductive material on the at least one of the given ones of said flexible substrate are coupled to said coupler associated therewith.

21. The antenna array of claim 17 in combination with:
an additional antenna loop disposed at an angle with respect to said at least two antenna loops to further define the detection region in which said two antenna loops and said additional antenna loop transmit and/or receive electromagnetic signals, wherein said additional antenna loop defines a loop through which an object may pass; and
means coupling said additional antenna loop and said processor for coupling at least the received signals therebetween.

22. The antenna array of claim 21 wherein said additional antenna loop is disposed at an angle of between about 45° and about 135° with respect to said two antenna loops.

23. The antenna array of claim 17 in combination with a utilization system operable in conjunction with the transmitted signals and the received signals.

24. The antenna array of claim 17 wherein said utilization system includes one of toll collection, object identification, stolen object identification, theft prevention, object tracking, package tracking, baggage tracking, retailing, inventory tracking, factory and/or warehouse inventory, security identification, and/or access control.

25. The antenna array of claim 17 wherein said detection region includes at least one of a portal, a passage, a passageway, a doorway, an access, an egress, a security gate, a toll gate, an electronic gate, a retail check-out station, a corridor, a tunnel, a conveyor, a baggage cart, an enclosure, a storage space, a container, a shipping container, a pallet, a cargo bay, a truck, a trailer, a loading area, and a warehouse.

26. An antenna array for detecting a wireless article associated with an object comprising:
at least two loop antennas disposed at an angle with respect to each other to define a detection region in which each of said two loop antennas transmit and/or receive electrical signals,
wherein an electromagnetic field associated with the electrical signals has components in each of three mutually orthogonal directions, the detection region thereby defined having a volume into which and/or through which the object and its associated wireless article may pass;

each of said two loop antennas including a loop conductor arranged to crossover to form two loops of smaller dimension than the loop antenna, each smaller loop of each antenna being in a different plane than the other smaller loop of that loop antenna;

wherein the two smaller loops of each loop antenna are disposed respectively in two planes disposed at an angle of between about 45° and about 135° with respect to each other;

whereby the loon conductor of each loon antenna defines two loons each in a different plane, for a total of four loops in four different planes, a processor for processing at least received electrical signals for detecting the wireless article associated with the object; and means for coupling at least the received electrical signals between said at least two loop antennas and said processor.

27. The antenna array of claim 26 further comprising a third loop antenna having a loop conductor disposed so that an object to be detected passes therethrough.

28. The antenna may of claim 26 wherein said means for coupling includes at least one of a filter and a switch for selectively connecting said at least two loop antennas and said processor.

29. The antenna array of claim 26 wherein said processor processes transmitted electrical signals and the received electrical signals, wherein the transmitted electrical signals are coupled to said at least two loop antennas to be transmitted thereby.

30. The antenna ray of claim 26 in combination with a wireless article including an antenna coupled to an electronic device including a memory, wherein said processor processes transmitted electrical signals receivable by the electronic device via the antenna of said wireless article and processes received electrical signals produced by the electronic device.

31. The antenna array of claim 26 in combination with a utilization system operable in conjunction with the transmitted electrical signals and the received electrical signals.

32. The antenna array of claim 31 wherein said utilization system includes one of toll collection, object identification, stolen object identification, theft prevention, object tracking, package tracking, baggage tracking, retailing, inventory tracking, factory and/or warehouse inventory, security identification, and access control.

33. The antenna array of claim 26 wherein said detection region includes at least one of a portal, a passage, a passageway, a doorway, an access, an egress, a security gate, a toll gate, an electronic gate, a retail cheek-out station, a corridor, a tunnel, a conveyor, a baggage cart, an enclosure, a storage space, a container, a shipping container, a pallet, a cargo bay, a truck, a trailer, a loading area, and a warehouse.

34. A detection arrangement for detecting a wireless article associated with an object within a detection region, wherein the detection region is defined with respect to three mutually orthogonal directions X, Y and Z, wherein the three mutually orthogonal directions define three mutually orthogonal planes X-Y, X-Z and Y-Z, the detection arrangement comprising:

a first loop antenna having a loop conductor disposed substantially in the X-Y plane, wherein the first loop antenna transmits and/or receives electrical signals related to an associated electromagnetic field in the detection region;

a second loop antenna having a loop conductor disposed substantially in a plane rotated about the X direction to be at an angle with respect to the X-Y plane, wherein the second loop antenna transmits and/or receives electrical signals related to an associated electromagnetic field in the detection region;

a third loop antenna having a loop conductor disposed substantially in a plane rotated about the Y direction to be at an angle with respect to the X-Y plane, wherein the third loop antenna transmits and/or receives electrical signals related to an associated electromagnetic field in the detection region;

wherein if the object and its associated wireless article pass through the detection region, then to object and its associated wireless article pass through each of said first, second and third loon antenna;

whereby each of said first, second and third loop antenna produces an electromagnetic field into detection region if transmitting electrical signals and responds to an electromagnetic field in the detection region if receiving electrical signals, the electromagnetic fields associated with said first, second and third loop antenna together having field components m each of three mutually orthogonal directions, a processor for processing at least received electrical signals for detecting the wireless article associated with the object; and means for coupling at least the received electrical signals between said first, second and third loop antenna and said processor.

35. The detection arrangement of claim 34 wherein said means for coupling includes at least one of a filter and a switch for selectively connecting said first, second and third loop antenna and said processor.

36. The detection arrangement of claim 34 wherein said processor processes transmitted electrical signals and received electrical signals, wherein the transmitted electrical signals are coupled to said first second and third loop antenna to be transmitted thereby.

37. The detection arrangement of claim 34 in combination with an object comprising a wireless article including an antenna coupled to an electronic device including a memory, wherein said processor processes transmitted electrical signals receivable by the electronic device via the antenna of said wireless article and processes received electrical signals produced by the electronic device.

38. The detection arrangement of claim 37 wherein electrical signals received by the electronic device one of activate, operate, or control the electronic device and cause storing of information in the memory or reading of information from the memory.

39. The detection arrangement of claim 34 in combination with a wireless article including an antenna coupled to an electronic device including a memory, wherein said processor processes received electrical signals produced by the electronic device.

40. The detection arrangement of claim 34 further comprising:

at least one additional loop antenna disposed substantially in one of the X-Z and Y-Z planes proximate the detection region, wherein said at least one additional loop antenna transmits and/or receives electrical signals related to an associated electromagnetic field in the detection region; and means coupling said additional loop antenna and said processor for coupling at least the received electrical signals therebetween.

41. The detection arrangement of claim 34 further comprising:
   at least two additional loop antenna disposed generally parallel to each other and disposed at opposite sides of the detection region,
   wherein said two additional loop antenna transmit and/or receive electrical signals related to an associated electromagnetic field in the detection region; and
   means coupling said at least two additional loop antenna and said processor for coupling at least the received electrical signals therebetween.

42. The detection arrangement of claim 34 in combination with a utilization system operable in conjunction with the transmitted electrical signals and the received electrical signals.

43. The detection arrangement of claim 42 wherein said utilization system includes one of toll collection, object identification, stolen object identification, theft prevention, object tracking, package tracking, baggage tracking, retailing, inventory tracking, factory and/or warehouse inventory, security identification, and access control.

44. The detection arrangement of claim 34 wherein said detection region includes at least one of a portal, a passage, a passageway, a doorway, an access, an egress, a security gate, a toll gate, an electronic gate, a retail check-out station, a corridor, a tunnel, a conveyor, a baggage cart, an enclosure, a storage space, a container, a shipping container, a pallet, a cargo bay, a truck, a trailer, a loading area, and a warehouse.

45. An antenna array for detecting an object within a detection region comprising:
   at least two antenna loops disposed at an angle with respect to each other to transmit and/or receive electrical signals via an associated electromagnetic field having a component in each of three mutually orthogonal directions in the detection region into which or through which an object may pass;
   a processor for processing at least received electrical signals for detecting the object;
   means selectively coupling said at least two antenna loops and said processor,
   wherein said means for selectively coupling alternatingly or sequentially couples at least the received electrical signals of said at least two antenna loops to said processor during a tine that the object is within the detection region, and
   wherein the received electrical signals of said at least two antenna loops are coupled alternatingly or sequentially to said processor;
   an additional antenna loop disposed at an angle with respect to said at least two antenna loops to transmit and/or receive electrical signals in the detection region, wherein said additional antenna loop defines a loop through which the object may pass; and
   wherein said means for selectively coupling couples at least received electrical signals of said additional antenna loop to said processor during the time that the object is within the detection region, and
   wherein the received electrical signals of said additional antenna loop are coupled alternatingly or sequentially with the received electrical signals of the at least two antenna loops.

46. The antenna array of claim 45 wherein the angle at which said two antenna loops are disposed is between about 45° and about 135°.

47. The antenna array of claim 45 wherein said processor processes transmitted electrical signals and the received electrical signals, wherein the transmitted electrical signals are coupled to said two antenna loops to be transmitted thereby.

48. The antenna array of claim 47 in combination with a wireless article including an antenna coupled to an electronic device including a memory, wherein said processor processes transmitted electrical signals receivable by the electronic device via the loop antenna and processes received electrical signals produced by the electronic device.

49. The antenna array of claim 48 wherein the electrical signals received by the electronic device one of activate, operate, or control the electronic device and cause storing of information in the memory or reading of information from the memory.

50. The antenna array of claim 45 in combination with a wireless article including a loop antenna coupled to an electronic device including a memory, wherein said processor processes received electrical signals produced by the electronic device.

51. The antenna array of claim 45 wherein said additional antenna loop is disposed at an angle of between about 45° and about 135° with respect to said two antenna loops.

52. The antenna may of claim 45 in combination with a utilization system operable in conjunction with the transmitted electrical signals and the received electrical signals.

53. The antenna array of claim 52 wherein said utilization system includes one of toll collection, object identification, stolen object identification, theft prevention, object tracking, package tracking, baggage tracking, retailing, inventory tracking, factory and/or warehouse inventory, security identification, and access control.

54. The antenna array of claim 43 wherein the detection region includes at least one of a portal, a passage, a passageway, a doorway, an access, an egress, a security gate, a toll gate, an electronic gate, a retail check-out station, a corridor, a tunnel, a conveyor, a baggage cart, an enclosure, a storage space, a container, a shipping container, a pallet a cargo bay, a truck, a trailer, a loading area, and a warehouse.

55. An antenna array for detecting an object within a detection region comprising:
   at least two antenna loops disposed at an angle with respect to each other to transmit and/or receive electrical signals via an associated electromagnetic field having a component in each of three mutually orthogonal directions in the detection region into which or through which an object may pass;
   a processor for processing at least received electrical signals for detecting the object;
   means selectively coupling said at least two antenna loops and said processor,
   wherein said means for selectively coupling alternatingly or sequentially couples at least the received electrical signals of said at least two antenna loops to said processor during a time that the object is within the detection region, and
   wherein the received electrical signals of said at least two antenna loops are coupled alternatingly or sequentially to said processor;
   at least two additional antenna loops disposed at an angle with respect to each other and disposed opposing said at least two antenna loops to transmit and/or receive electrical signals in the detection region; and
   wherein said means for selectively coupling couples at least received electrical signals of said two additional antenna loops to said processor during the time that the object is within the detection region, and wherein the received electrical signals of said two additional antenna loops are coupled alternatingly or sequentially with the received electrical signals of the at least two antenna loops.

* * * * *